United States Patent [19]

Lienhard et al.

[11] 4,154,361
[45] May 15, 1979

[54] QUICK OPENING PRESSURE RELEASE DEVICE AND METHOD

[75] Inventors: John H. Lienhard; Gurudatt S. Borkar, both of Lexington, Ky.

[73] Assignee: Electric Power Research Institute, Inc., Palo Alto, Calif.

[21] Appl. No.: 896,757

[22] Filed: Apr. 17, 1978

[51] Int. Cl.² .................................................. B65D 43/26
[52] U.S. Cl. .................. 220/284; 220/260; 220/315; 220/324; 138/89
[58] Field of Search .......... 220/260, 284, 315, 324, 220/3; 138/89

[56] References Cited

U.S. PATENT DOCUMENTS

| 3,387,738 | 6/1968 | Kemp | 220/324 X |
| 3,397,813 | 8/1968 | Kelly et al. | 220/324 |

*Primary Examiner*—George T. Hall
*Attorney, Agent, or Firm*—Flehr, Hohbach, and Test

[57] ABSTRACT

A lightweight pressure release plug is retained by two cam-shaped pivoting arms. The plug is released by dropping a cam shaped weight which rotates the arms to release the plug.

15 Claims, 7 Drawing Figures

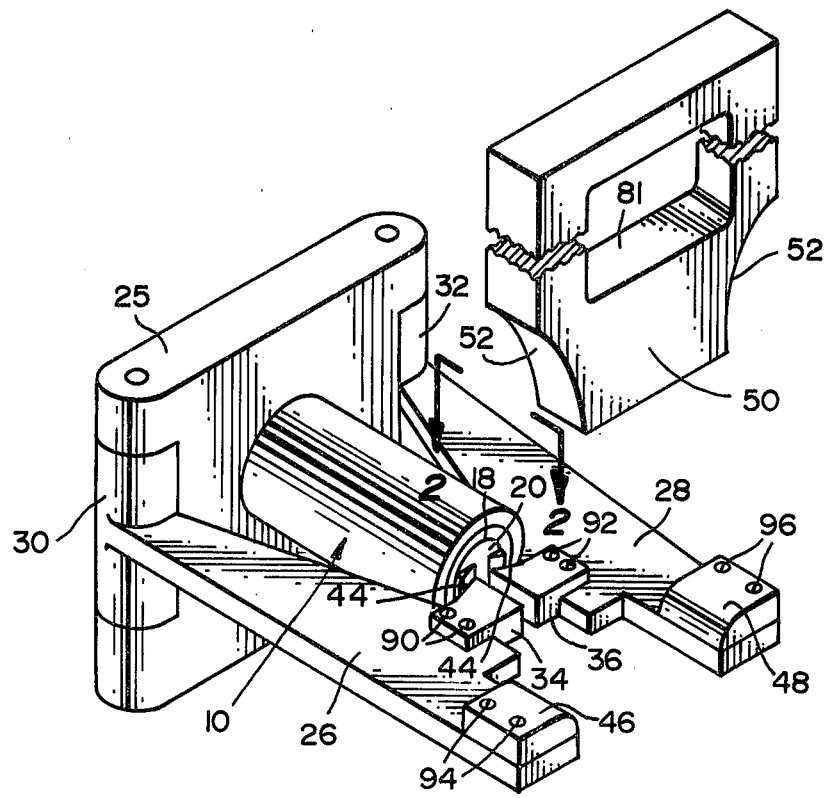
FIG. 1
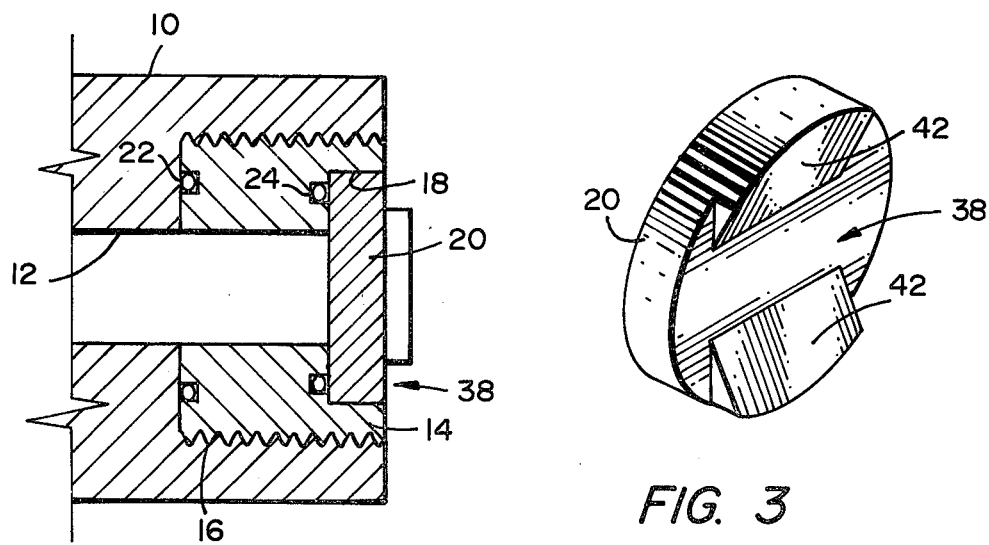
FIG. 2
FIG. 3

QUICK OPENING PRESSURE RELEASE DEVICE AND METHOD

BACKGROUND OF THE INVENTION

This invention relates generally to a pressure release device and more particularly to a device capable of rapidly depressurizing a pressure vessel to ambient pressure.

Controlled pressure release devices capable of rapidly releasing pressure are useful in pressure vessel blowdown studies. Devices of this type are also useful in industrial applications where high pressure release is important for safety and other purposes.

Devices for initiating quick pressure release in the past have employed diaphragms or discs which close a pressure vessel and are ruptured. This method is uncomplicated but suffers from four limitations. First, it does not afford sufficient control over break sizes and break rates, which are important parameters in blowdown studies. Second, the impact between the diaphragm or disc and the rupturing tool sets up undesirable disturbances in the pressurized medium. Third, an irregular unbroken portion of the diaphragm or disc is invariably left behind making the exact area of the opening unpredictable, thereby preventing controlled experimentation. Finally, the opening rate is slowed by the time required to tear this disc or diaphragm.

SUMMARY AND OBJECTS OF THE INVENTION

It is a general object of the present invention to provide a pressure release device which is simple in construction.

It is another object of the present invention to provide a quick opening pressure release device in which the measurement rate of opening and the character of the resultant opening are predictable.

It is another object of the present invention to provide a quick opening pressure release device and method in which the opening of a pressure vessel is rapid.

It is a further object of the present invention to provide a quick opening pressure release device in which the rate of depressurization is controllable.

The foregoing and other objects of the invention are achieved by providing a device for rapidly releasing pressure in a pressure vessel. The device includes means defining an opening adapted to be placed in communication with a vessel, together with a plug for closing the opening. A pair of movable arms engage the plug to releasably hold the plug over the opening. The arms are movable out of engagement with the plug to release the plug whereby pressure is released through the opening. Cam means engage the arms to rapidly move the arms out of engagement with the plug. In its preferred form, the cam means of the invention includes cam surfaces which are shaped to impart a predetermined rate of acceleration to the arms.

BRIEF DESCRIPTION OF THE DRAWINGS

FIG. 1 is a perspective view of the opening portion of a quick opening pressure release device in accordance with the present invention.

FIG. 2 is an enlarged view of the seat and plug portions of the device in cross-section taken along line 2—2 of FIG. 1.

FIG. 3 is an enlarged view of the plug shown in FIGS. 1 and 2.

DESCRIPTION OF THE PREFERRED EMBODIMENT

Figures 4, 5:
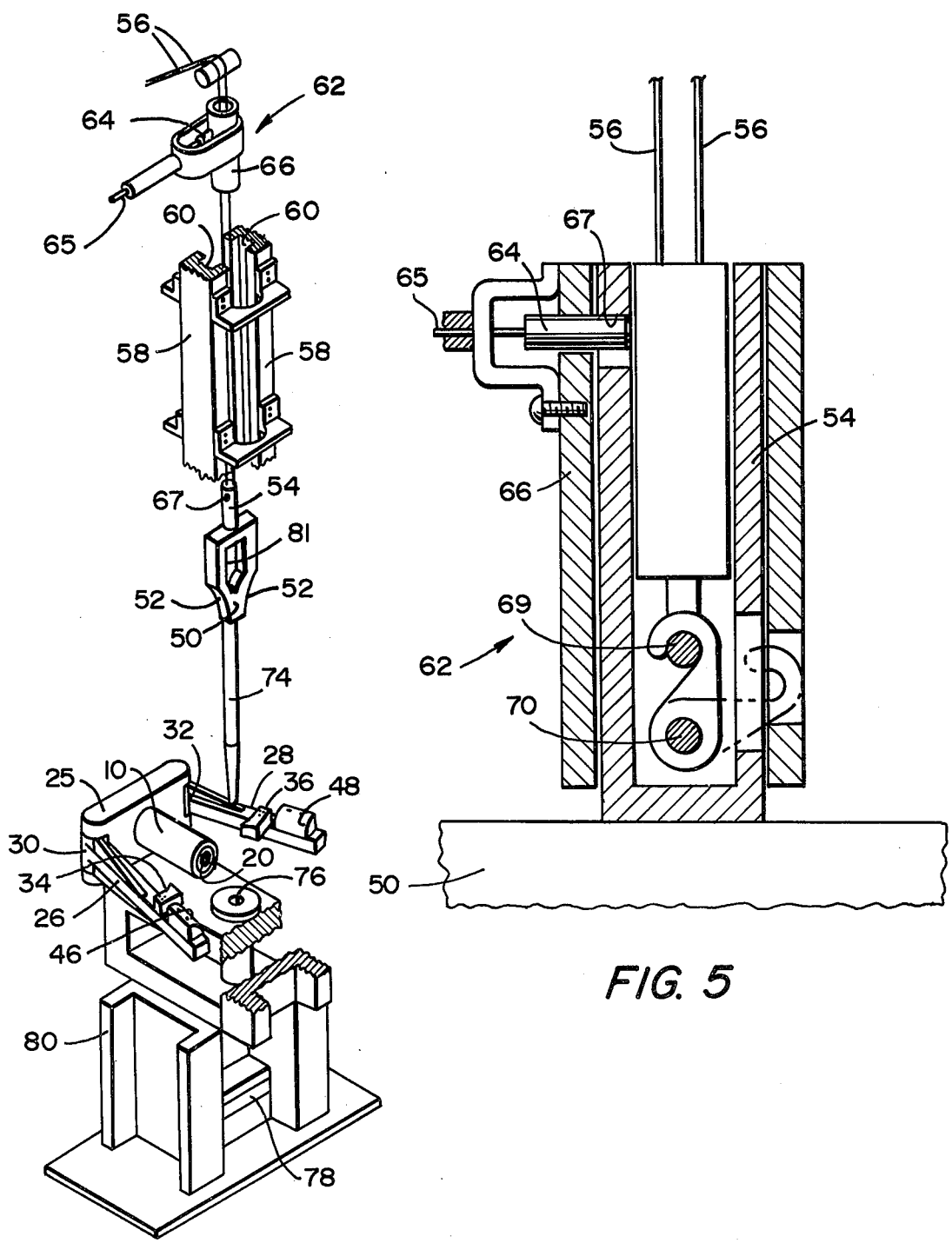
FIG. 4 is a perspective view showing the supporting structure for the device shown in FIG. 1 and for the weighted cam.
FIG. 5 is an enlarged cross-sectional view of the hold and release mechanism for the device shown in FIG. 4.

Referring to FIG. 1, a preferred device according to the invention includes a pipe 10 which communicates with a pressure vessel (not shown) such as a tank or pipe for holding water or another fluid under pressure. Pipe 10 has an interior passage 12, shown in FIG. 2, which provides an outlet from the pressure vessel. A threaded insert member 14 with an interior passage matching passage 12 is fitted within cooperating threads 16 at the end of pipe 10. An opening 18 in insert 14 defines the outlet from the pressure vessel. A plug 20 is provided for closing opening 18. In conjunction with seals 22 and 24 in insert 14, plug 20 effectively seals passage 12 and the pressure vessel when firmly held in opening 18.

Associated with pipe 10 is a support member 25 through which pipe 10 extends. Member 25 pivotally supports a pair of movable arms 26 and 28 by means of hinges 30 and 32, respectively. Arms 26 and 28 include laterally-extending retaining portions 34 and 36, respectively. The retaining portions are movable in a direction generally lateral to the outer surface 38 of the plug, so as to extend over opening 18 from opposite sides. When the arms are in a first position, as shown in FIG. 1, portions 34 and 36 extend over and contact the outer surface 38 of plug 20, engaging and releasably holding the plug over the opening of the pressure vessel.

As shown most clearly in FIG. 3, the outer surface 38 of plug 20 is contoured to provide a pair of raised angled faces 42. These contoured faces substantially match similarly-angled surfaces 44 on the retaining portions 34 and 36 of the arms. Both faces 42 and surfaces 44 lie in a plane tangent to the path of rotation of the retaining portions of the arms.

Figure 6:
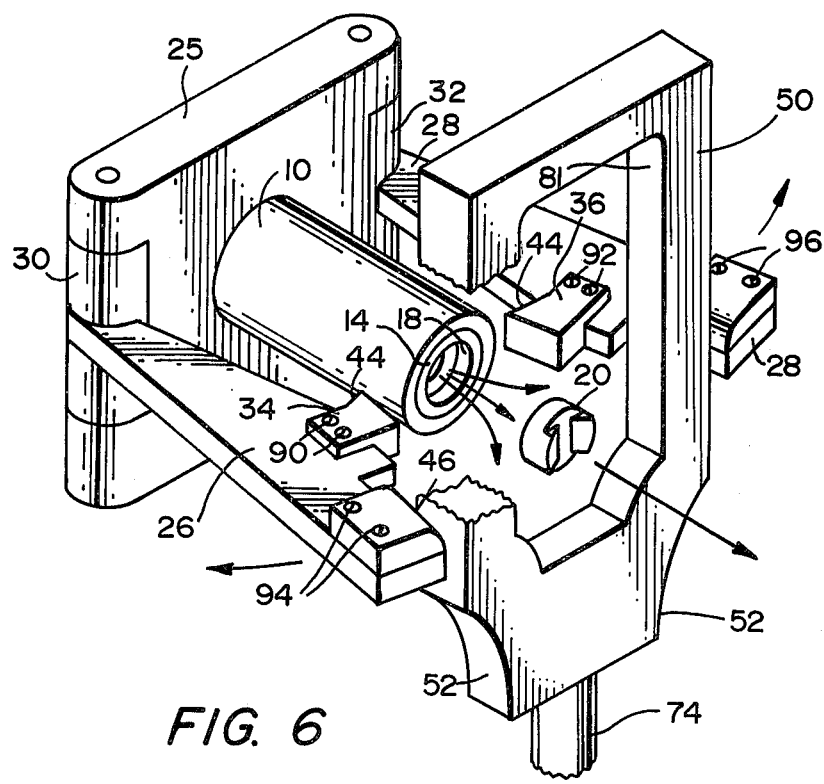
FIG. 6 is a perspective view as in FIG. 1 partially cut away showing the release of the plug to cause depressurization.

Arms 26 and 28 are movable away from the first position shown in FIG. 1 out of engagement with the plug to release plug 20, as shown in FIGS. 4 and 6. The arms rotate outwardly in opposite directions to separate and disengage the retaining portions of the arms from plug 20. Cam means for moving the arms include small cam surfaces 46 and 48 at the outer extremities of arms 26 and 28, respectively. A large weighted cam 50 is suspended above cams 46 and 48 on the arms. Cam 50 includes cooperating cam surfaces 52 which engage cams 46 and 48 is rapidly move the arms out of engagement with plug 20 when cam 50 is dropped into contact with the cams on the arms. Cam 50 rotates arms 26 and 28 outwardly in opposite directions when dropped. The rate at which the arms are separated is determined by the shape of the cams, the weight of cam member 50, and the height from which it is dropped. In the preferred embodiment, the curved surfaces of cams 46 and 48 on the arms have a radius of ¼ inch, and surfaces 52 on cam 50 are circular and have a radius of 1½ inches.

The cams impart a predetermined rate of acceleration to the arms when cam 50 is dropped from a specified height. Moreover, each time cam 50 is dropped from a given height the acceleration imparted to the arms is the same, making possible controlled experimentation. The rate of acceleration of the arms can be altered by changing the shape of the cam surfaces or the movement of cam 50.

A suggested apparatus for raising and releasing weighted cam 50 is shown in FIGS. 4 and 5. The upper end of cam 50 includes a hooking mechanism enclosed in a cylindrical housing 54. The hooking mechanism connects the cam with hoisting cables 56 which are used to raise the cam. Cam 50 moves within a guide 58 having suitable channels 60 for aligning the cam. Guide 58 is formed of any suitable material such as aluminum, and serves to precisely position cam 50 relative to arms 26 and 28. At the upper end of guide 58 is a release mechanism 62 for holding and releasing cam 50.

Referring to FIG. 5, release mechanism 62 includes a pin 64 attached to an actuating cable 65 and supported by a large sleeve member 66. The pin is suitably biased to enter hole 67 in housing 54. When housing 54 is drawn into sleeve 66 and pin 64 enters hole 66, cam 50 is locked in an elevated position. A pin 69 at the end of cables 56 is hooked by hook 70 to the housing 54. The hook is released by slackening tension on the cables after the cam has been locked in its elevated position using pin 64. The release of tension causes hook 70 to fall away, as shown in phantom in FIG. 5, releasing the cam. Suitable biasing means or an off center-of-gravity design can be used to cause hook 70 to fall away when released.

The lower part of the guide system for cam 58 is shown in FIG. 4. A tapered rod 74 is attached to the lower part of cam 50. A circular channel 76 for receiving rod 74 is formed beneath the falling cam. Beneath channel 76 are suitable shock absorbing pads 78 which absorb the impact of the descending cam. The shock absorbing pads can be formed of layers of carpeting or another suitable resilient material. Support frame 80, which rests on the floor, provides support for the lower guide system and also supports pipe 10 and member 25 to which arms 26 and 28 are attached.

Operation of the quick pressure release device includes initially fitting a plug 20 in opening 18 and then swinging arms 26 and 28 into the first position shown in FIG. 1. Retaining portions 34 and 36 extend laterally over outer surface 38 of the plug, securely holding the plug in place and sealing the pressure vessel. The vessel is then pressurized to the desired pressure. Cam 50 is elevated and latched in its suspended position above cam surfaces 46 and 48 on the arms.

The method of releasing pressure in the vessel by means of the invention is initiated by pulling actuating cable 65 to extract pin 64 from hole 66. That releases cam 50 and drops the cam through guide 58 between the arms, camming arms 26 and 28 outwardly out of engagement with plug 20, thereby releasing the plug. As shown in FIG. 6, the pressure in the vessel and in channel 12 drives the plug from opening 18 causing a quick release of pressure through the passage. The plug passes through the hole 81 in cam 50 as it is ejected. The lower rod of the cam comes to rest in channel 76, with the impact being absorbed by material 78.

In the preferred embodiment, cam 50 together with release housing 54 and tapered rod 74, have a total weight of approximately 13 pounds. The cam is suspended approximately nine feet above arms 26 and 28. Pipe 10 has an inner diameter (channel 12) of ½ inch. Plug 20 has a mass of approximately 3.15 grams. With these values, the device has achieved blowdowns from initial pressures that are greater than 2,000 pounds per square inch down to atmospheric pressure at rates as high as 23 million psi/second using heated water at approximately 600° F. Eighty percent decompression is achieved in as little as 100 microseconds from release of the plug.

Experimentation using different plugs shows that the speed of depressurization depends on the mass of the plug. Plugs with a reduced mass provide a higher rate of depressurization. Consequently, the plug is preferably formed of a light material such as aluminum or titanium. Plug lightness is limited principally by the need for sufficient strength to withstand the pressure in the vessel.

To use the quick pressure release device in blowdown studies it is desirable to precisely determine the time at which plug 20 is released by arms 26 and 28. Suitable sensors can be incorporated on one or both of the movable arms for this purpose. Such sensors (not shown) could be positioned on stand 80 to detect outward movement of the arms, triggering a pressure monitoring device associated with an oscilloscope.

Figure 7:
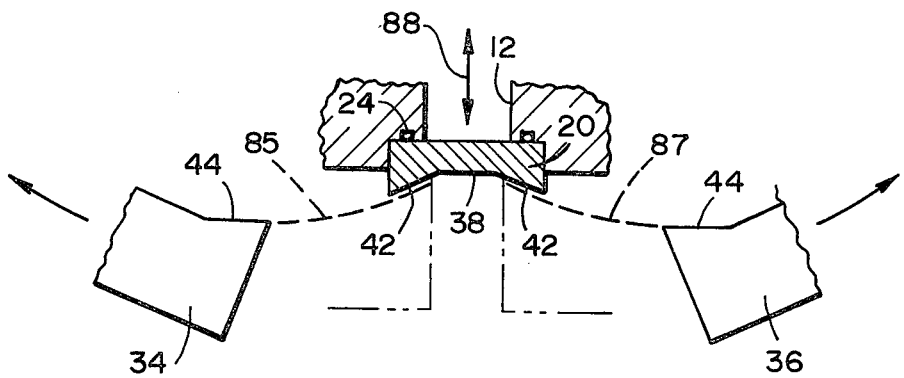
FIG. 7 is an enlarged cross-sectional view showing the path of the retaining portion of the arms relative to the plug.

To minimize minute disturbances in the pressure medium within passage 12 and the pressure vessel, it is desirable to reduce the axial movement of plug 20 as the retaining portions of arms 26 and 28 slide laterally off the plug. Angled faces 42 on plug 20 help to reduce such axial motion. Referring to FIG. 7, lines 85 and 87 represent the circular paths followed by the contact surfaces 44 of retaining portions 34 and 36 of the arms. Faces 42 are angled so as to be locally parallel to circular paths 85 and 87. The result is relatively little axial movement of the plug in the direction of arrows 88 as the plug is released. Although faces 42 are flat in the preferred embodiment, both faces 42 and surfaces 44 could be curved to precisely conform to circular paths 85 and 87. Use of such curved surfaces would virtually eliminate motion of the plug during opening but would make the plugs significantly more expensive to manufacture.

To provide precise alignment of the arms with the plug, retaining portions 34 and 36 include adjusting screws 90 and 92, respectively. The adjusting screws permit movement or replacement of the retainers to accommodate differing plug sizes or shapes. Similar adjusting screws 94 and 96 are provided on cam surfaces 46 and 48, respectively, to precisely position the cams. These various adjusting means make possible nearly simultaneous release of plug 20 by both of the arms. Suitable adjusting means could also be provided for guide 58 if precise positioning of the dropping cam 50 proves necessary. Conversely, if the apparatus is to be used solely in a controlled release environment where changes in the cam surfaces are not required, adjusting screws 90, 92, 94, and 96 can be eliminated.

The device and method of the invention achieves rates of depressurization far higher than previous rupture disc systems. The concept of a falling cam separating restraining arms to release a reusable plug eliminates the need for complicated pellet guns or unpredictable disposable diaphragms. Tests using the present invention are reproducable in all essential features. The system performs satisfactorily at high temperatures and pressures. Furthermore, this system can be used with openings of various sizes and the rate of opening can be varied by changing the mass of the plug. It is intended that tube 10 and arms 12 as well as the remaining parts of the device be detachable from a tank or other pressure vessel to permit changing of the vessel. The device is highly reliable and can be used in industrial applications as a safety release device.

Alternative embodiments are possible within the scope of the invention. For example, the retaining arms could be movably supported by means other than hinges. The arms could be supported to slide sideways on tracks or the like. Cam 50 could be driven into the release position by means of a powerful spring or other means, such as an explosive charge or solenoid, rather than by means of gravity. The plug could be positioned over the vessel opening, rather than being inset into a countersink. An advantage of positioning the plug over the opening is that the vessel is opened more quickly. An inset configuration is preferred, however, because the opening is more controlled, especially if the release of the arms is not simultaneous.

The invention provides a pressure release device which is simple in construction and in which the rate of opening and the character of the resultant opening are predicatable. The invention provides a device in which the opening of the pressure vessel is rapid. Furthermore, the rate of depressurization is controllable.

What is claimed is:

1. A device for rapidly releasing pressure in a pressure vessel comprising: means defining an opening adapted to be placed in communication with said vessel, a plug for closing said opening, a pair of movable arms which engage said plug to releaseably hold said plug over said opening, said arms being movable out of engagement with said plug to release said plug whereby said pressure is released through said opening, and cam means for engaging said arms to rapidly move said arms out of engagement with said plug.

2. A device as in claim 1 in which said cam means includes cam surfaces which engage to move said arms, said cam surfaces being shaped to impart a predetermined rate of acceleration to said arms.

3. A device as in claim 2 in which each said arm includes one said cam surface, said cam means further including a movable cam member having cooperating cam surfaces which engage said cam surfaces on said arms to move said arms.

4. A device as in claim 3 in which said movable cam member is weighted, said device including means for dropping said movable cam member into contact with said cam surfaces on said arms.

5. A device as in claim 1 in which said plug includes an outer surface engaged by said arms, each said arm including a retaining portion movable generally laterally over said outer surface, said retaining portions extending over and contacting said outer surface of said plug to releasably hold said plug over said opening.

6. A device as in claim 5 in which said arms are moved outwardly in opposite directions by said cam means to move said retaining portions generally laterally off said outer surface of said plug.

7. A device as in claim 1 in which said arms are each pivotally supported for rotation.

8. A device as in claim 7 in which said plug includes an outer surface engaged by said arms, each said arm including a retaining portion extending over said outer surfaces to engage said plug, said retaining portions being movable generally laterally in a circular path off said outer surface to release said plug, said outer surface being contoured to provide a pair of faces each locally parallel to said circular path followed by each said retaining portion whereby displacement of said plug during release is minimized.

9. A device for rapidly releasing pressure in a pressure vessel comprising: means defining an opening adapted to be placed in communication with said vessel, a plug for closing said opening, a pair of arms each pivotally supported for movement into engagement with said plug to releasably hold said plug over said opening, said arms being rotatable out of engagement with said plug to release said plug, each said arm including a cam surface thereon, and a movable cam member having cooperating cam surfaces which engage said cam surfaces on said arms to rotate said arms out of engagement with said plug, said cam surfaces on said arms and said movable cam member being shaped to impart a predetermined rate of acceleration to said arms.

10. A device as in claim 9 in which said movable cam member is weighted, said device including means for dropping said cam member into contact with said cam surfaces on said arms.

11. A device as in claim 10 in which said plug includes an outer surface engaged by said arms, each said arm including a retaining portion extending over and contacting said outer surface to hold said plug over said opening, said retaining portions each being movable in a circular path generally laterally over said outer surface.

12. A device as in claim 11 in which said movable cam member rotates said arms in opposite directions to separate said retaining portions to release said plug.

13. A device as in claim 12 in which said outer surface of said plug is contoured to provide a pair of faces each locally parallel to said circular path followed by each said retaining portion whereby displacement of said plug during release is minimized.

14. A method for rapidly releasing pressure in a pressure vessel having an opening, a plug over said opening, a pair of movable arms engaging and releasably holding said plug over said opening to close said vessel, and a weighted cam member elevated over said arms, comprising the steps of: releasing said cam member to cam said arms out of engagement with said plug thereby releasing said plug, and causing said plug to move from said opening by means of pressure in said vessel to release said pressure.

15. A method as in claim 14 in which said arms are movable laterally into engagement with said plug from opposite sides of said opening, said step of releasing said cam member including releasing said cam member between said arms to cam said arms outwardly.

* * * * *